United States Patent Office 3,654,288
Patented Apr. 4, 1972

3,654,288
2-(2-PIPERIDYL)ACETAMIDES
Joseph Hellerbach, Basel, Switzerland, assignor to
Hoffmann-La Roche, Inc., Nutley, N.J.
No Drawing. Original application Mar. 28, 1967, Ser. No.
626,387, now Patent No. 3,515,725, dated June 2,
1970. Divided and this application Mar. 6, 1970, Ser.
No. 17,321
Claims priority, application Switzerland, Apr. 6, 1966,
5,052/66
Int. Cl. C07d 29/30
U.S. Cl. 260—293.76           3 Claims

ABSTRACT OF THE DISCLOSURE 2,3a-diazahydrindanone and 3H-pyrido-[1,2-c]pyrimidin-3-one derivatives useful as analgesics, antiphlogistics, anti-allergics and anti-inflammatory agents.

RELATED APPLICATIONS

This application is a division of United States patent application Ser. No. 626,387 filed Mar. 28, 1967 now U.S. Patent No. 3,515,725, patented June 2, 1970.

BRIEF SUMMARY OF THE INVENTION

The invention relates to novel intermediates of the formula

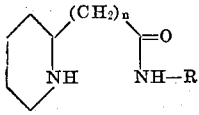

wherein R signifies hydrogen, lower alkyl, lower alkyl bearing one or more substituents selected from the group consisting of hydroxy, halogen, amino, lower alkylamino, di-lower alkylamino and heterocyclic radicals; aryl, aryl bearing one or more substituents selected from the group consisting of halogen, nitro, amino, hydroxy, lower alkyl, lower alkoxy, amino-lower alkyl, mono-lower alkylamino-lower alkyl, di-lower alkylamino-lower alkyl, trifluoromethyl, lower alkoxycarbonyl, lower acyl and lower alkanoylamido; aralkyl, aralkyl bearing on the aryl moiety one or more substituents selected from the group consisting of halogen, nitro, amino, hydroxy, lower alkyl, lower alkoxy, amino-lower alkyl, mono-lower alkylamino-lower alkyl, di-lower alkylamino-lower alkyl, trifluoromethyl, lower alkoxycarbonyl, lower acyl and lower alkanoylamido; and $n$ signifies the value 0 or 1.

The compounds of Formula II are useful as intermediates for the preparation of the heterocyclic compounds of the formula

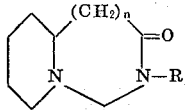

wherein R and $n$ are as previously described
and pharmaceutically acceptable acid addition salts and quaternary salts thereof. The compounds of Formula I are analgesics, antiphlogistics, antiallergics and anti-inflammatory agents.

DETAILED DESCRIPTION OF THE INVENTION

In accordance with this invention, compounds of the formula

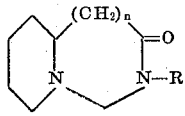

are prepared by reacting a compound of the formula

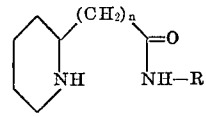

wherein R and $n$ are as previously described, with formaldehyde. If desired, the substituent R can be modified and the base thus obtained can be converted into a pharmaceutically acceptable acid addition salt or into a pharmaceutically acceptable quaternary salt.

As used herein, the term "lower alkyl" denotes a straight or branched chain hydrocarbon of 1–7 carbon atoms, preferably of 1–4 carbon atoms, such as methyl, ethyl, propyl and isopropyl. The term "lower alkoxy" denotes lower alkyl ether groups in which the lower alkyl moiety is as described above. The term "aryl" denotes phenyl and naphthyl, preferably phenyl.

Preferred substituted aryl are: alkoxycarbonylphenyl such as, 2-methoxycarbonyl-phenyl; halophenyl, such as p-fluorophenyl and nitro- and halo-substituted phenyl, such as 3-nitro-4-chloro-phenyl and 2-nitro-4-chloro-phenyl.

The term "aralkyl" denotes a straight or branched chain lower alkyl group in which one or more of the hydrogen atoms have been replaced by an aryl group. Benzyl and phenethyl are preferred. The term "lower acyl" denotes lower alkyl carbonyl groups in which lower alkyl is as described above. The term "lower alkanoyl" denotes an alkanoyl residue of a lower carboxylic acid of 1–7 carbon atoms. The term "halogen" is to be understood to include chlorine, bromine, iodine and fluorine. Chlorine, bromine and fluorine are preferred. The term "heterocyclic radical" denotes a 5- and 6-membered heterocyclic radical having one or more atoms of nitrogen, oxygen or sulfur. Examples of these are pyridyl, pyrimidyl, thienyl, thiazolyl, furyl and the like.

When $n$ in the above Formula I signifies the value 0, the compounds are 2,3a-diazahydrindanone derivatives of the formula

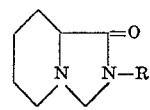

Examples of compounds of Formula III are:

2-(m-trifluoromethylphenyl)-2,3a-diazahydrindanone,
2-(3',4'-dimethoxyphenyl)-2,3a-diazahydrindanone,
2-(p-methoxyphenyl)-2,3a-diazahydrindanone,
2-(o-methoxycarbonylphenyl)-2,3a-diazahydrindanone hydrochloride,
2-(p-hydroxyphenyl)-2,3a-diazahydrindanone,
2-(diethylaminoethyl)-2,3a-diazahydrindanone dihydrobromide,
2-(p-fluorophenyl)-2,3a-diazahydrindanone hydrochloride,
2-(p-chlorophenyl)-2,3a-diazahydrindanone,
2-(p-nitrophenyl)-2,3a-diazahydrindanone,
2-(m-nitrophenyl)-2,3a-diazahydrindanone hydrochloride, and the like.

When $n$ in the above Formula I signifies the value 1, the compounds are 3H-pyrido-[1,2-c]pyrimidin-3-one derivatives of the formula

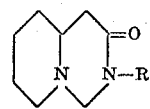

Examples of compounds of Formula IV are:

Octahydro-2-(m-nitrophenyl)-3H-pyrido-[1,2-c] pyrimidin-3-one hydrochloride,
Octahydro-2-(p-ethoxyphenyl)-3H-pyrido-[1,2-c] pyrimidin-3-one hydrochloride,
Octahydro-2-(m-chlorophenyl)-3H-pyrido-[1,2-c] pyrimidin-3-one hydrochloride,
Octahydro-2-(benzyl)-3H-pyrido-[1,2-c]pyrimidin-3-one hydrochloride,
Octahydro-2-(3',4'-dichlorophenyl)-3H-pyrido-[1,2-c] pyrimidin-3-one hydrochloride,
Octahydro-2-(p-nitrophenyl)-3H-pyrido-[1,2-c] pyrimidin-3-one hydrochloride,
Octahydro-2-(o-nitrophenyl)-3H-pyrido-[1,2-c] pyrimidin-3-one hydrochloride,
Octahydro-2-(o-methoxycarbonyl-phenyl)-3H-pyrido-[1,2-c]pyrimidin-3-one hydrochloride,
Octahydro-2-(o-chlorophenyl)-3H-pyrido-[1,2-c] pyrimidin-3-one hydrochloride,
Octahydro-2-(3'-nitro-4'-chlorophenyl)-3H-pyrido-[1,2-c]pyrimidin-3-one,
Octahydro-2-(4'-chloro-3'-nitrophenyl)-3H-pyrido-[1,2-c]pyrimidin-3-one hydrochloride,
Octahydro-2-(2'-nitro-4'-chlorophenyl)-3H-pyrido-[1,2-c]pyrimidin-3-one hydrochloride
Octahydro-2-(2',5'-dichlorophenyl)-3H-pyrido-[1,2-c] pyrimidin-3-one hydrochloride,
Octahydro-2-(p-fluorophenyl)-3H-pyrido-[1,2-c] pyrimidin-3-one,
Octahydro-2-(4-acetamido-phenyl)-3H-pyrido-[1,2-c] pyrimidin-3-one and the like.

The starting materials of Formula II wherein $n$ signifies the value 0 are compounds of the formula

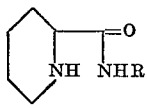

V and can be prepared in accordance with the following reaction scheme:

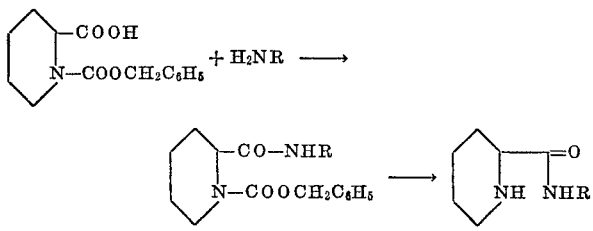

V

Examples of compounds of Formula V are:

α-pipecolinic acid m-trifluoromethyl anilide,
α-pipecolinic acid 3,4-dimethoxy anilide,
α-pipecolinic acid p-methoxy anilide,
α-pipecolinic acid o-methoxycarbonyl anilide,
α-pipecolinic acid p-hydroxy anilide,
α-pipecolinic acid diethylaminoethylamide,
α-pipecolinic acid p-fluoro anilide,
α-pipecolinic acid p-chloro anilide,
α-pipecolinic acid p-nitro anilide,
α-pipecolinic acid m-nitro anilide, and the like.

The starting materials of Formula II wherein $n$ signifies the value 1 are compounds of the formula

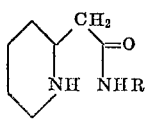

VI and can be prepared in accordance with the following reaction scheme:

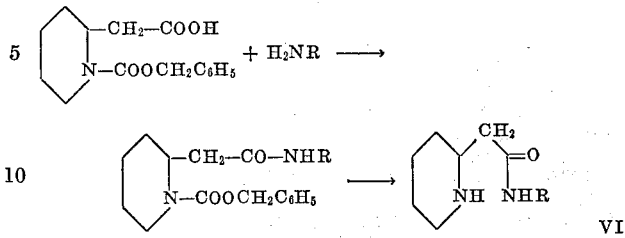

VI

Examples of compounds of Formula VI are:

2-(2-piperidyl)acetic acid m-nitroanilide,
2-(2-piperidyl)acetic acid p-ethoxyanilide,
2-(2-piperidyl)acetic acid m-chloroanilide,
2-(2-piperidyl)acetic acid benzylamide,
2-(2-piperidyl)acetic acid 3,4-dichloroanilide,
2-(2-piperidyl)acetic acid p-nitroanilide,
2-(2-piperidyl)acetic acid o-nitroanilide,
2-(2-piperidyl)acetc acid 2-methoxycarbonyl anilide,
2-(2-piperidyl)acetic acid o-chloroanilide,
2-(2-piperidyl)acetic acid 3-nitro-4-chloro anilide,
2-(2-piperidyl)acetic acid 2-nitro-4-chloro anilide,
2-(2-piperidyl)acetic acid 2,5-dichloroanilide,
2-(2-piperidyl)acetic acid p-fluoroanilide,
2-(2-piperidyl)acetic acid 4-acetamido anilide, and the like.

The manufacture of the starting materials is more precisely set forth in the examples.

The reaction of the starting materials of Formula II with formaldehyde is conveniently carried out using an aqueous formaldehyde solution and suspending therein the starting material. If desired, the reaction can also be carried out in the presence of an organic solvent, for example, a lower aliphatic alcohol such as methanol or ethanol. The reaction proceeds at room temperature. However, conveniently the reaction mixture is heated preferably at reflux temperatures. After cooling the reaction mixture and, if desired after concentration under reduced pressure, the product obtained can be isolated in the usual manner, as by filtration, and purified, as by crystallization.

If desired, the substituent R of a compound thus obtained can be modified in a further step of the process. Thus, for example, a nitroaryl substituent can be reduced to the corresponding aminoaryl substituent. Furthermore, an aminoalkyl group can be converted to a mono- or dialkylamino-alkyl group, or a hydroxyalkyl group to a haloalkyl group utilizing known procedures.

Finally, the bases obtained in accordance with the process of the invention can, if desired, be transformed into pharmaceutically acceptable acid addition salts or quaternary salts. Acid addition salts can be obtained by treatment of the bases with inorganic or organic acids, such as, hydrochloric acid, hydrobromic acid, sulfuric acid, phosphoric acid, acetic acid, citric acid, malic acid, tartaric acid and the like. Quaternary salts can be produced in the usual manner by treatment with alkyl halides, dialkyl sulfates and the like.

The compounds of Formula I are useful analgesics, antiphlogistics, antiallergics and anti-inflammatory agents.

For such uses, the compounds of Formula I are formulated, using conventional inert pharmaceutical adjuvant materials, into dosage forms which are suitable for oral or parenteral administration. Such dosage forms include tablets, suspension, solutions, etc. Furthermore, the compounds of this invention can be embodied into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, and the like. Moreover, preservatives, stabilizers, wetting agents, emulsifying agents, salts for altering osmotic pressure, buffers, etc. can be incorporated, if desired, into such formulations.

The quantity of active medicament which is present in any of the above-described dosage forms is variable. It is preferred, however, to provide capsules or tablets containing from about 20 mg. to about 50 mg. of the Formula I base or an equivalent amount of a pharmaceutically acceptable acid addition salt or quaternary salt thereof. For parenteral administration, it is preferred to provide a solution containing from about 10 mg./ml. to about 20 mg./ml. of the Formula I base, or an equivalent quantity of pharmaceutically acceptable acid addition salt or quaternary salt thereof.

The frequency with which any such dosage form will be administered to a patient will vary, depending upon the quantity of active medicament present therein and the needs and requirements of the patient, as diagnosed by the prescribing practitioner. Under ordinary circumstances, however, up to about 2 mg./kg. of the compound can be administered daily in several doses. It is to be understood, however, that the dosages set forth therein are exemplary.

The invention will be better understood by reference to the following examples which are given for illustration purposes. Temperatures, unless otherwise stated, are expressed in degrees centigrade.

Example 1

22.5 g. of 2-(2-piperidyl)acetic acid m-nitroanilide are dissolved in a mixture of 20 ml. of methanol and 100 ml. of 38% aqueous formaldehyde solution. The resulting solution is boiled at reflux for 2 hours and then concentrated under reduced pressure to about half its original volume. After dilution with water, the reaction product is taken up in ether and washed with water. After evaporation of the ether, there remains a residue which is octahydro - 2 - (m - nitrophenyl) - 3H - pyrido - [1,2-c] pyrimidin-3-one, the hydrochloride of which, after recrystallization from alcohol/ether, melts at 237–238°.

The 2-(2-piperidyl)acetic acid m-nitroanilide used herein as starting material was prepared as follows:

27.7 g. of N-carbobenzoxy-2-(2-piperidyl)acetic acid were dissolved in 50 ml. of dioxane. The resulting solution was treated with a solution of 16.6 g. of m-nitroaniline in 50 ml. of dioxane. The mixture thus obtained was treated at room temperature with a solution of 24 g. of N,N'-dicyclohexylcarbodiimide in 30 ml. of dioxane. After about 18 hours, the precipitated dicyclohexyl-urea was removed by filtration, the filtrate concentrated under reduced pressure and the residue taken up in ether. The ethereal solution was successively washed with dilute hydrochloric acid, water, dilute sodium carbonate solution, water, and dried over magnesium sulfate. The residue remaining behind after evaporation of the solvent under reduced pressure, was dissolved in glacial acetic and treated under ice-cooling with 120 ml. of 33% hydrobromic acid. After about 18 hours, the solution obtained was evaporated under reduced pressure and the residue that remained was taken up in water and ether. The aqueous phase, which contained the desired reaction product in salt form, was once more extracted with ether and the ether extract was discarded. After the addition of concentrated ammonia to the aqueous solution, 2-(2-piperidyl)acetic acid m-nitroanilide separated and was taken up in methylene chloride and washed with water. The base remaining behind after the solvent was removed by distillation, yielded the corresponding hydrochloride having a melting point of 252–253°.

Following the procedure of Example 1, but substituting for the m-nitro-aniline p-ethoxy-aniline,
m-chloro-aniline,
benzylamine,
3,4-dichloro-aniline
p-nitro-aniline,
o-nitroaniline,
2-methoxycarbonyl-aniline,
o-chloro-aniline,
3-nitro-4-chloro-aniline,
2-nitro-4-chloro-aniline,
2,5-dichloro-aniline,
p-fluoro-aniline, or
4-acetamido-aniline there are obtained starting materials of the formula

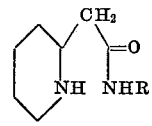

and end products of the formula

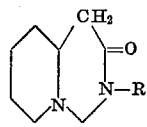

respectively set forth in Table I.

TABLE I

| R | Starting material M.P., salt or base | End product M.P., salt or base |
|---|---|---|
| —C₆H₄—OC₂H₅ | Base/125° | Base/103–4°, HCl/197–199°. |
| —C₆H₄—Cl | Base/oil | HCl/190–191°. |
| —CH₂—C₆H₅ | Base/crystalline | HCl/180–180°. |
| —C₆H₃(Cl)—Cl | Base/105–6° | HCl/210–220°. |
| —C₆H₄—NO₂ | HCl/262–263° | HCl/228–229°. |
| —C₆H₄—NO₂ (ortho) | HCl/222–223° | HCl/223–224°. |
| —C₆H₄—COOCH₃ | HCl/173–4° | HCl/193–194°. |
| —C₆H₄—Cl | HBr/217–218° | HCl/234–5°. |
| —C₆H₃(Cl)(NO₂) | Base/100°, HBr/228° | Base/138°, HCl/219–220°. |
| —C₆H₃(Cl)(NO₂) | HBr crude/217–218° | HCl/209–210°. |
| —C₆H₃(Cl)—Cl | HBr/219–220° | HC./227–228°. |

TABLE I.—Continued

| R | Starting material M.P., salt or base | End product M.P., salt or base |
|---|---|---|
| —⟨ ⟩—F | HCl/212-3° | HCl/219-220°. |
| —⟨ ⟩—NHCOCH₃ | Base/205-6° | HCl/231-2°. |

Example 2

16 g. of α-pipecolinic acid m-trifluoromethyl-anilide are refluxed for 2 hours with 160 ml. of 28% formaldehyde and 2 ml. of ethanol. Upon cooling of the reaction mixture, 2-(m-trifluoromethyl-phenyl)-2,3a-diazahydrindan-one of melting point 145–146° precipitates.

The pipecolinic m-trifluoromethyl-anilide used herein as the starting material was prepared as follows:

A solution of 21 g. of N,N'-dicyclohexyl-carbodiimide in 50 ml. of dioxane was successively treated with 16 g. of m-trifluoromethyl-aniline and a solution of 26 g. of N-carbobenzoxy-α-pipecolinic acid in 50 ml. of dioxan. The reaction mixture was allowed to stand overnight, the precipitated N,N'-dicyclohexylurea was removed by filtration and the filtrate was evaporated under reduced pressure. The residue was dissolved in ether. The ethereal solution was successively washed with dilute hydrochloric acid, water, dilute sodium carbonate solution and again with water. After evaporation of the ether, the residue was dissolved in 50 ml. of 33% hydrobromic acid and α-pipecolinic acid m-trifluoromethyl-anilide hydrobromide of melting point 260° C. crystallized out. The free base obtained from this hydrobromide in the usual manner melts at 205°.

Following the procedure of Example 2, but substituting for the m-trifluoromethyl-aniline 3,4-dimethoxy-aniline,
p-methoxy-aniline,
o-methoxycarbonyl-aniline,
p-hydroxy-aniline,
diethylaminoethylamine,
p-fluoro-aniline,
p-chloro-aniline,
p-nitro-aniline,
m-nitro-aniline, there are obtained starting materials of the formula

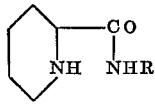

and end products of the formula

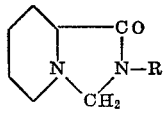   III respectively set forth in Table II.

TABLE II

| R | Starting material M.P., salt or base | End product M.P., salt or base |
|---|---|---|
| —⟨ ⟩—OCH₃ (with OCH₃) | Base/78° | Base/127°, HCl/215-216°. |
| —⟨ ⟩—OCH₃ | Base/113-114° | HCl/126°. |
| —⟨ ⟩—COOCH₃ | Base/oil | HBr/200°. |
| —⟨ ⟩—OH | Base/230° | Base/168-170°, HCl/232-233°. |

TABLE II.—Continued

| R | Starting material M.P., salt or base | End product M.P., salt or base |
|---|---|---|
| —CH₂—CH₂—N(C₂H₅)₂ | Base/oil | 2HBr/178°. |
| —⟨ ⟩—F | HBr/263-4° | HCl/202-203°. |
| —⟨ ⟩—Cl | HBr/285° | Base/131-132°, HCl/179-180°. |
| —⟨ ⟩—NO₂ | Base/103-105° | Base/141-142°, HCl/203°. |
| —⟨ ⟩ (NO₂) | HCl/251-252° | HCl/189-190°. |

Example 3

Tablets can be prepared in a known manner utilizing the following formulation:

|  | Mg. |
|---|---|
| Octahydro-2-(2'-nitro-4-chloro-phenyl)-3H-pyrido[1,2-c]pyrimidin-3-one hydrochloride | 25.00 |
| Milk sugar | 79.00 |
| Corn starch | 43.00 |
| Magnesium stearate | 0.30 |
| Talc | 2.70 |
| Total | 150.00 |

I claim:
1. A compound of the formula

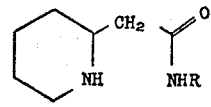

wherein R is benzyl or phenyl bearing 1 or 2 substituents selected from the group consisting of lower alkoxycarbonyl, wherein lower alkoxy is of 1–7 carbon atoms, and lower alkanoylamido, wherein lower alkanoyl is of 1–7 carbon atoms.

2. A compound in accordance with claim 1, 2-(2-piperidyl) acetic acid benzylamide.

3. A compound in accordance with claim 1, 2-(2-piperidyl) acetic acid 2-methoxycarbonyl anilide.

References Cited

UNITED STATES PATENTS

| 2,792,399 | 5/1957 | Ekenstem et al. | 260—294 |
| 3,055,891 | 9/1962 | Cusic et al. | 260—243 |

FOREIGN PATENTS

| 330,320 | 7/1958 | Switzerland | 260—240 |

OTHER REFERENCES

Baker et al.: J. Org. Chem., 20, 118–9 and 125 (1955).
Sam et al.: J. Am. Chem. Soc., 81, 710–13 (1959).
Weiss et al.: Helv. Chim. Acta, 37, 263–7 (1954); C.A. 50:6527i.
Winterfeld et al.: Arch. Pharm., 293, 203–10 (1960); C.A. 55:529b.
Winterfeld et al.: Chem. Ber., 92, 637–9 and 641–2 (1959).

HENRY R. JILES, Primary Examiner

G. T. TODD, Assistant Examiner

U.S. Cl. X.R.

260—293.77